A. B. WOOD.
FLUID MEASURING DEVICE.
APPLICATION FILED MAY 31, 1916.
1,339,997.
Patented May 11, 1920.
2 SHEETS—SHEET 1.
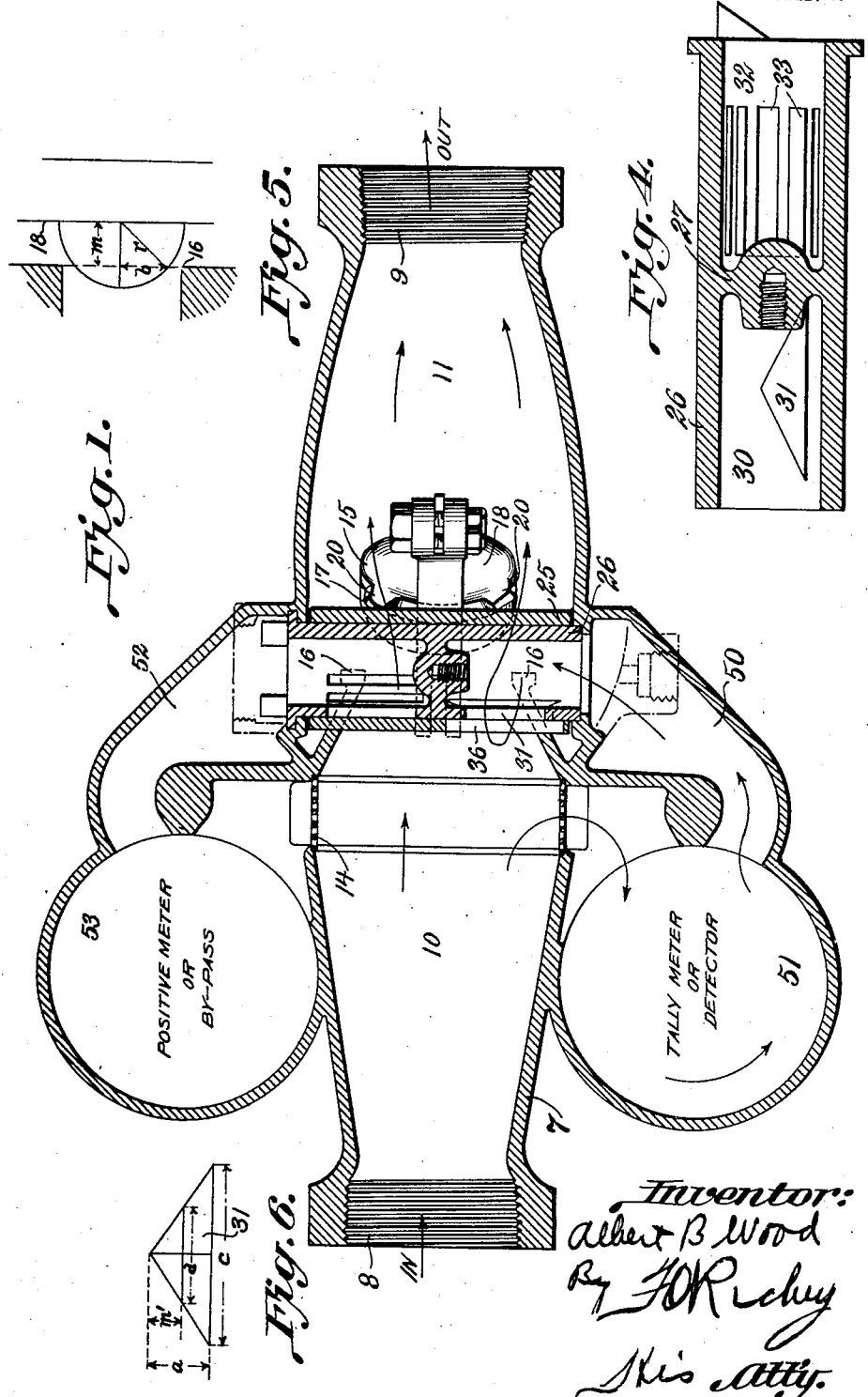
Inventor:
Albert B Wood
By F.O.Richey
His Atty.

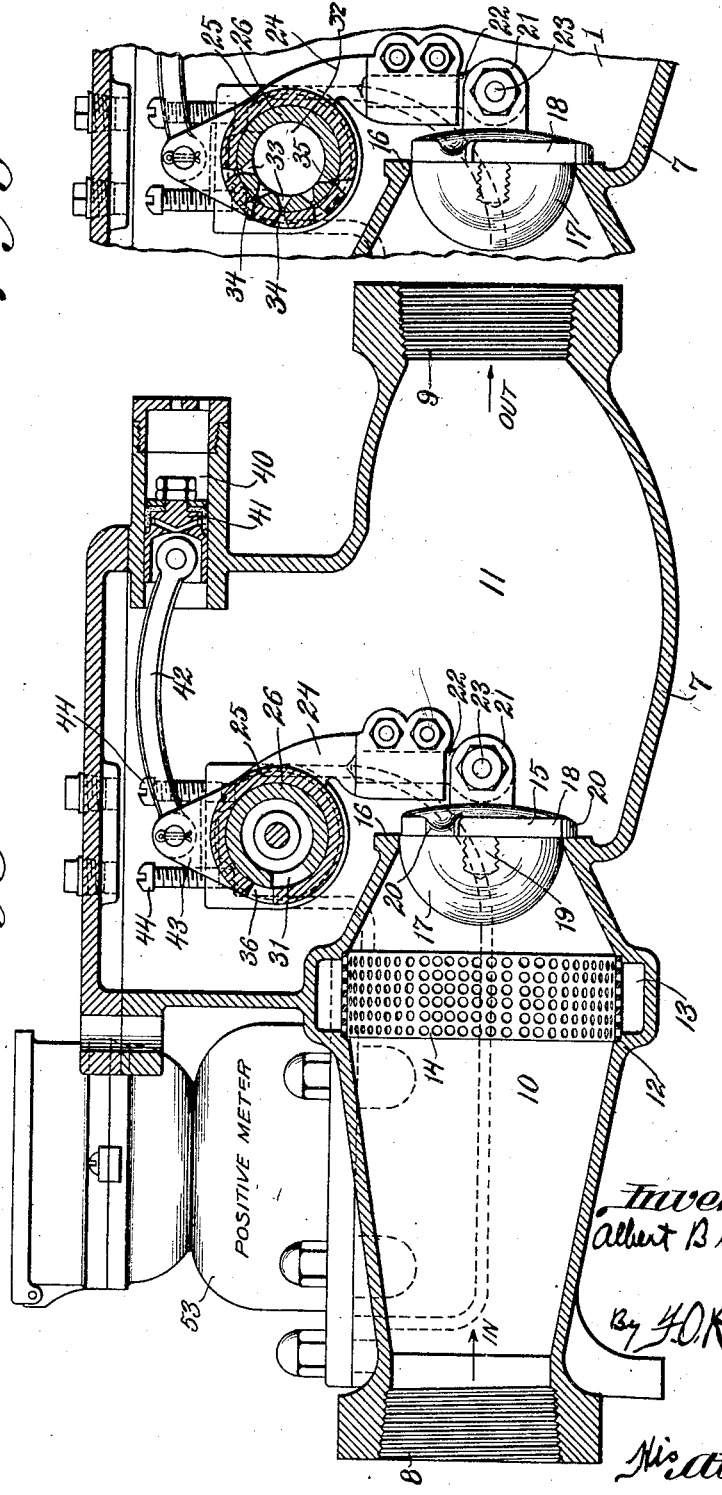

UNITED STATES PATENT OFFICE.

ALBERT BALDWIN WOOD, OF NEW ORLEANS, LOUISIANA, ASSIGNOR OF ONE-THIRD TO CHARLES ARTHUR BROWN, OF LORAIN, OHIO, AND ONE-THIRD TO GEO. G. EARL, OF NEW ORLEANS, LOUISIANA.

FLUID-MEASURING DEVICE.

1,339,997.  Specification of Letters Patent.  Patented May 11, 1920.

Application filed May 31, 1916.  Serial No. 100,845.

*To all whom it may concern:*

Be it known that I, ALBERT B. WOOD, a citizen of the United States, residing at New Orleans, in the parish of Orleans and State of Louisiana, have invented certain new and useful Improvements in Fluid-Measuring Devices; and I do hereby declare the following to be a full, clear, and exact description of the invention, such as will enable others skilled in the art to which it appertains to make and use the same.

My invention relates in general to means for measuring a quantity of fluid flowing in a water main, being more particularly adapted to measure the flow of water or similar fluids in city or similar water mains.

I am aware that in such art prior to the improvements set forth herein, means have been provided for passing the normal flow of water through the main into a by-pass where it traverses a meter, and where there is an extraordinary flow a portion only of the water is diverted through a second by-pass where it is measured by a proportional or tally meter. I am also aware that in such devices the main conduit has been normally closed by a valve, which opens during extraordinary flows in the main, and in doing so, controls the by-pass through the positive meter to close said by-pass and opens the pass through the proportional meter.

My invention relates more particularly to such devices, and I aim to provide means to more accurately register the amount of water flowing through the by-passes when the valves controlling such by-passes and the main conduit are being opened and closed. In accomplishing the above object, I also provide means which will not catch trash flowing through the conduit and thereby cause congestion in the same.

These and other objects of the invention and the invention itself, I believe, will be understood from a description of an embodiment of the invention.

Figure 1 is a horizontal sectional view of apparatus showing an embodiment of my invention.

Fig. 2 is a vertical sectional view of the apparatus shown in Fig. 1.

Fig. 3 is a partial vertical section upon another line in Fig. 2.

Fig. 4 is a section through one of the elements of the apparatus.

Figs. 5 and 6 are diagrams to illustrate the operation of the apparatus shown in the drawings.

Referring now to the drawings and to the embodiment of the invention illustrated therein, at 7 is shown a portion of a conduit or duct, such for example, as is employed to conduct water from a reservoir or other source to a city or other object. The water flows from the source, not shown, into the section 7 at the end 8 and out at the end 9, as indicated by the arrows. The section 7 may be of any suitable shape, but I have preferred to form it as shown, where there are two chambers 10 and 11, the chamber 10 being connected to the end 8 and the chamber 11 to the end 9 of 7. The chamber 10 in the embodiment shown is preferably made wider at the central portion 12, in order to increase the pressure at the entrance to the ducts 50 and 52. An annular cell 13 is formed in the chamber 10 and a screen 14 is placed in the mouth thereof to prevent trash from entering. A valve is shown at 15 which will hereinafter be referred to as the main valve to distinguish it from the other valves which I will mention. The valve 15 fits in a seat 16 which is preferably formed in the conduit between the chambers 10 and 11. I have here shown what is termed a spherical valve, which consists of a hemispherical portion 17 connected to a base 18 by suitable means, such as a threaded stud 19 which fits in a central opening correspondingly threaded in the part 17. The diameter of the body portion of 18 is preferably made of the same dimensions as the maximum diameter of the part 17, a plurality of lugs 20 extending radially from the periphery of the base 18 to engage the edge of the valve seat 16 when the valve is seated. With this arrangement the water begins to flow unimpeded directly past the valve as soon as it begins to open. I thereby avoid any eddies or any undue retardation which would be effected by a flange employed to engage the seat, the lugs 20, of course, being so small that any retardation or eddying effect caused thereby would be inappreciable. The importance of this will appear in the further description.

A stem 21 is connected to the valve base 18 and a pin 22 is pivotally connected thereto by some suitable connecting means, such as a bolt 23. The pin 22 is connected in a socket in one end of a link 24 which is connected at the other end to one of the elements 25 of a valve. In the form shown the element 25 consists of a hollow cylinder which is adapted to be rotated about a second hollow cylinder 26 whose interior is divided into two cells or chambers by a web 27. The cylinder 26 is connected to the conduit in any suitable manner to remain stationary during the operation of the device. One of the cells 30 of the valve element 26 is provided with an opening 31, here shown as of the shape of an isosceles triangle, for the purpose of regulating the flow of water through the cell 30 in true proportion to the flow of water past the main valve when the same is being opened and closed. The other cell 32 in the valve element 26 is provided with a plurality of slot openings 33 which are adapted to coöperate with a plurality of slot openings 34 in the valve element 25. The sides of these openings converge toward the adjacent edges of the valve members. In the form shown this convergence is discontinued as the opening approaches the edge of its element, whereupon the opening is conducted upon a substantially straight line, as shown at 35, to the edge.

When in normal position, the openings 33 and 34 together form Venturi tubes, which, according to well known hydraulic laws, will permit a free flow of fluid. However, when the valve elements are even slightly displaced with respect to each other the Venturi tube effect will be destroyed and the resistance to the flow will be so great as to practically instantaneously stop the flow of fluid through the valve. The valve element 25 is provided with an opening 36 to coöperate with the opening 31. This opening may be simply a slot in the element 25. Means are provided for regulating the movement of the main valve, such as a dash-pot 40 provided with a piston 41 connected by links 42 and 43 to the element 26. Adjusting means are shown at 44 for adjusting the relative position of the openings in the auxiliary valve when the main valve is seated. The cell 30 is connected to the cell 13 by means of a by-pass 50 in which there is connected a proportional or tally meter 51 and the cells 32 and 13 are connected by a by-pass 52 in which there is connected a direct or positive meter 53.

The operation of the device is as follows: When the main valve is in closed position, such as shown in Figs. 2 and 3, water cannot flow past the main valve 15, but is diverted from the cell 13 through the by-pass 52 and the portion 32 of the auxiliary valve which is in the position shown in Fig. 3. This flow is adequate to take care of the small demand at the source of demand, and is measured by the positive or direct meter 53. Should, however, the demand increase, the pressure in the chamber 11 will become so much less than the pressure in the chamber 10, due to the sudden demand, that this pressure will act upon the main valve causing the same to begin to open and moving it away from the seat 16. Immediately the main valve is moved the by-pass 52 will be effectively closed, owing even to a slight movement of the element 26 with respect to the element 25 and to the destruction of the small venturis formed by the coöperating openings in said elements. A still further movement of the main valve will entirely close these openings. By these means it will be seen that water cannot be flowing through both meters at the same time.

Immediately the main valve is moved from the seat, the water flows directly past the same, as has been explained. The extent of the opening of the main valve will, of course, depend upon the demand. As the main valve opens, the opening will be in proportion to an isosceles triangle. This can be understood by reference to Fig. 5 where the valve has been shown diagrammatically in a slightly open position. As the main valve opens and the by-pass 52 is closed, the by-pass 50 is opened through the isosceles triangle opening 31, the apex of which will first overlap the opening 36 and permit water to flow therethrough. As the main valve opens, the opening 31 will be moved farther along, increasing the opening in the by-pass 50, thereby maintaining a flow through the by-pass 50 which will be absolutely proportional to the flow past the main valve. Perhaps these relations can be better explained by referring to Figs. 5 and 6.

Let A be the area of the opening extending between the edge of the seat 16 and the main valve and in a plane parallel to the face of the valve seat as shown in Fig. 5, which opening I have found to be the governing or controlling opening. Then A will equal $\pi r^2 - \pi b^2$, which is equal to $\pi(r^2 - b^2)$, where $r$ is the radius of the hemispherical portion 17 of the valve and $b$ is the radius of the portion within the seat, as indicated in Fig. 5. Now by the right triangle $rbm$, $r^2 - b^2$ equals $m^2$, where $m$ is the distance between 16 and the front face of 18. Substituting, A equals $\pi(m^2)$, whereby we find that the area of the governing opening of the main valve is proportional to the square of the displacement of the main valve from the closed position. Referring now to Fig. 6, where $a$ is the altitude of the opening 31 and $c$ is the base, and considering an opening made by a displacement $m'$ which is equivalent to a displacement $m$ of the main valve the area $A'$ of the opening will be $\frac{1}{2}m'd$, where $d$ is the base of the opening. Now $$\frac{m'}{d}$$

is equal to $$\frac{a}{c},$$

from which $d$ equals $$m'\left(\frac{c}{a}\right).$$

Now substituting, $A'$ will be equal to $$\left(\tfrac{1}{2}\frac{c}{a}\right)(m')^2.$$

In other words, the area of the opening in the auxiliary valve in the by-pass 50 is proportional to the square of the movement, so that the opening in the main valve and the opening in the by-pass 50 will be proportional throughout the movement of the valve and the proportional meter 51 will give a true and accurate indication of the water flowing past the main valve. The rounded or hemispherical shape of the valve will permit trash, etc., to flow freely past the valve without catching and clogging the same.

It will be seen that I have provided a metering device which very accurately measures both large and small flows through the same. I do not wish to be limited to these particular shapes of valves and openings, but I consider it very important that the means controlling the flow through the positive meter should be capable of practically instantaneously closing the by-pass 52 when the main valve has opened, and practically instantaneously opening it when the main valve has closed, and the means controlling the by-pass through the proportional meter should open and close such by-pass in true or substantially true proportion to the opening and closing of the main valve.

I have shown this particular embodiment of my invention and the details thereof for the purpose of illustrating and describing the same. I do not wish to be limited to such details or such embodiment, as many departures may be made therefrom without departing from the spirit of the invention.

I claim:—

1. In fluid metering apparatus, the combination of a main conduit through which fluid may flow, a main valve seat in said conduit, a main valve normally in said seat closing said conduit, said valve being hemispherical or substantially hemi-spherical, a by-pass associated with said conduit about said main valve, and a triangularly ported auxiliary valve in said by-pass controlled by the main valve.

2. In fluid controlling apparatus, the combination of a pair of valves one controlled by the other, one of said valves consisting of a spherical-section-shaped valve member normally seated in a circular opening and the other of which consists of a curtain normally closing a triangular opening.

3. In a fluid flow regulating apparatus, the combination of a pair of valves, one of which controls the other, one of said valves consisting of a spherical-section-shaped valve member controlling a circular opening and the other consisting of a curtain controlling an isosceles triangular slot and normally closing the same, the curtain extending from apex to base of the triangle when operated.

4. In fluid flow regulating apparatus, the combination of a pair of fluid ducts, a valve in each duct, one of which controls the other, one of said valves consisting of a spherical-section-shaped valve member operating in a circular opening, and the other valve consisting of a curtain controlling a triangular slot and normally closing the same, said curtain when the valve is operated moving from the apex to the base of the triangular slot as the other valve moves from normally closed to fully open positions.

5. In fluid metering apparatus, the combination of a main conduit, a valve in said conduit controlling the flow of fluid therethrough, a by-pass around said valve, and a second valve in said by-pass provided with a passage forming a Venturi tube, said Venturi tube being destroyed when said second valve is slightly displaced from open position.

6. In fluid metering apparatus, the combination of a main conduit, a valve in said conduit, a by-pass around said valve, a second valve in said by-pass comprising two members each provided with a passage which when in coincidence form a Venturi tube, and means to displace one of said members with respect to the other and to destroy said Venturi tube immediately said displacement begins.

7. In fluid metering apparatus, the combination of a conduit, a valve therein, a by-pass around said valve, a second valve in said by-pass comprising a pair of concentric inter-engaging cylinders, each provided with an opening which when in coincidence form a Venturi tube and means to destroy said venturi.

8. In a fluid system, the combination of a conduit, a valve in the conduit including a movable element which when moved opens an area proportional to the square of the movement of said valve from normal, a by-pass about the main valve, a second valve in the by-pass including a movable element which when moved opens an area proportional to the square of the movement of said second valve from normal and means to move said valves together.

9. In a fluid system, the combination of two ducts, a valve in each duct, each valve including a movable element which when moved opens an area proportional to the square of the distance of movement of the valve from normal and means to move said valves simultaneously and at the same rate.

In witness whereof, I have hereunto signed my name this 19th day of May, 1916.

ALBERT BALDWIN WOOD.